(12) United States Patent
Tilahun et al.

(10) Patent No.: US 12,715,672 B2
(45) Date of Patent: Aug. 25, 2026

(54) PACKAGED FOOD PRODUCT

(71) Applicant: Kraft Foods Group Brands LLC, Chicago, IL (US)

(72) Inventors: Muluken Tilahun, Lawrenceville, GA (US); Daniel Doucette, DeForest, WI (US); Daniel R. Feldmeier, Waunakee, WI (US); Paris Alexander Edwards Lowitz, San Francisco, CA (US); Stacy Alycia Thomas Castro, Verona, WI (US)

(73) Assignee: Kraft Foods Group Brands LLC, Chicago, IL (US)

( * ) Notice: Subject to any disclaimer, the term of this patent is extended or adjusted under 35 U.S.C. 154(b) by 213 days.

(21) Appl. No.: 17/550,971

(22) Filed: Dec. 14, 2021

(65) Prior Publication Data

US 2022/0106098 A1 Apr. 7, 2022

Related U.S. Application Data

(60) Continuation of application No. 16/662,960, filed on Oct. 24, 2019, now Pat. No. 11,230,419, which is a (Continued)

(51) Int. Cl.
*B65D 25/22* (2006.01)
*B65D 1/36* (2006.01)

(Continued)

(52) U.S. Cl.
CPC ............... *B65D 7/28* (2013.01); *B65D 25/22* (2013.01); *B65D 25/24* (2013.01); *B65D 77/20* (2013.01);

(Continued)

(58) Field of Classification Search
CPC ................................................. B65D 2207/00
See application file for complete search history.

(56) References Cited

U.S. PATENT DOCUMENTS

| | | | |
|---|---|---|---|
| D20,487 | S | 1/1891 | Je |
| 467,964 | A | 2/1892 | William |

(Continued)

FOREIGN PATENT DOCUMENTS

| | | |
|---|---|---|
| AU | 2017272261 | 1/2018 |
| CA | 2215873 | 3/1999 |

(Continued)

OTHER PUBLICATIONS

Administrative Appeal Decision, from related Spanish Patent Application No. 201590045, 2019, 5 pages. (English Translation).

(Continued)

*Primary Examiner* — Viren A Thakur
*Assistant Examiner* — Ashley Axtell
(74) *Attorney, Agent, or Firm* — Fitch, Even, Tabin & Flannery LLP

(57) ABSTRACT

A packaged food product may incorporate an angled back card to improve stability by providing an enlarged footprint when the package is standing upright, i.e., vertically oriented. The angled back card can provide a wider base of support between the front of the product and the back card to improve the ability of the package to be self-supporting in an upright position, i.e., to stand up reliably on a shelf without leaning on other structures for external support. The package may be generally dumbbell-shaped as viewed from the front and/or from other angles, and may comprise a center portion that is narrower and/or shallower than adjacent end portions. This may facilitate handling of the product by the consumer and also may help to provide the product with an impactful appearance and theme at retail (Continued)

when the product is viewed from the front and/or from other angles. The product may include high-protein food items, consistent with the theme established by the shape, and may include prominently-displayed information about the protein content of the food items.

15 Claims, 14 Drawing Sheets

Related U.S. Application Data division of application No. 14/655,678, filed as application No. PCT/US2013/076988 on Dec. 20, 2013, now abandoned.

(60) Provisional application No. 61/745,915, filed on Dec. 26, 2012.

(51) Int. Cl.

| | |
|---|---|
| ***B65D 6/22*** | (2006.01) |
| ***B65D 25/24*** | (2006.01) |
| ***B65D 77/20*** | (2006.01) |
| ***B65D 77/28*** | (2006.01) |
| ***B65D 85/00*** | (2006.01) |
| ***G06Q 30/02*** | (2023.01) |
| ***G06Q 30/0241*** | (2023.01) |
| *G06Q 99/00* | (2006.01) |

(52) U.S. Cl.

CPC ............ *B65D 85/70* (2013.01); *G06Q 30/02* (2013.01); *G06Q 30/0241* (2013.01); *B65D 2207/00* (2013.01); *B65D 2577/2091* (2013.01); *G06Q 99/00* (2013.01)

(56) References Cited

U.S. PATENT DOCUMENTS 813,428 A 2/1906 Howe
1,879,029 A 9/1932 Baumgard
D144,016 S 2/1946 Weideman
D165,683 S 1/1952 Fournier
D195,737 S 7/1963 Bassett
3,171,540 A 3/1965 Douglas
D218,514 S 8/1970 Fossella
3,565,245 A 2/1971 Asher
D222,668 S 11/1971 Gregor
D222,852 S 1/1972 Goins
3,685,649 A 8/1972 Diehl
3,785,546 A 1/1974 Kuster
D232,348 S 8/1974 Cloud
D273,765 S 5/1984 Cillario
D276,201 S 11/1984 Wolff
D279,865 S 7/1985 Mckee
4,653,685 A 3/1987 Leary
D292,379 S 10/1987 Pollitt
D293,767 S 1/1988 Powers
D297,115 S 8/1988 Fontana
D297,116 S 8/1988 Fontana
D297,117 S 8/1988 Fontana
D297,118 S 8/1988 Fontana
D297,119 S 8/1988 Fontana
4,836,380 A 6/1989 Walter
D303,215 S 9/1989 Hoyt
4,880,112 A 11/1989 Conrad
4,930,627 A 6/1990 Borst
4,962,849 A 10/1990 Anderson
5,011,006 A 4/1991 Anderson
5,042,652 A 8/1991 Grindrod
5,092,475 A 3/1992 Krishnakumar
5,119,940 A 6/1992 Grindrod
5,123,527 A 6/1992 Hustad
D335,821 S 5/1993 Detert
D337,048 S 7/1993 Detert
D337,268 S 7/1993 Detert
D338,808 S 8/1993 Anderson
D339,522 S 9/1993 Zoss
D341,624 S 11/1993 Evenson
D349,456 S 8/1994 Wilson
D351,556 S 10/1994 Reil
D352,202 S 11/1994 Campbell
D353,516 S 12/1994 Anderson
5,375,701 A 12/1994 Hustad
D363,856 S 11/1995 Westbrooks, Jr.
D366,187 S 1/1996 Van Den Kieboom
D371,940 S 7/1996 Krupa
D376,953 S 12/1996 Dunn
5,598,941 A 2/1997 Semersky
D378,726 S 4/1997 Dunn
5,620,112 A 4/1997 Brown
D381,264 S 7/1997 Lippincott
5,647,506 A 7/1997 Julius
5,657,874 A 8/1997 Hustad
D386,075 S 11/1997 Hayes
5,695,086 A 12/1997 Viola
5,695,798 A 12/1997 Rozzano
5,728,416 A 3/1998 Bono
5,730,288 A 3/1998 Weisburn
5,743,402 A 4/1998 Gics
D395,232 S 6/1998 Bryan, III
D395,233 S 6/1998 Bryan, III
D395,392 S 6/1998 Lahm
5,872,513 A 2/1999 Fitzgibbon
D408,280 S 4/1999 Manley
D408,684 S 4/1999 Helm
5,900,263 A 5/1999 Gics
D411,798 S 7/1999 Suzuki
5,922,376 A 7/1999 Privert
5,927,533 A 7/1999 Payne
D416,483 S 11/1999 Manley
D417,840 S 12/1999 Alpert
D419,061 S 1/2000 Croft
D420,283 S * 2/2000 Reichel .......................... D9/759
D420,855 S 2/2000 Hurley
D427,914 S 7/2000 Croft
6,092,664 A 7/2000 Bartosek
D429,147 S 8/2000 Baker
6,117,506 A 9/2000 Graboski
6,152,302 A 11/2000 Miller
D443,510 S 6/2001 Doucette
6,261,616 B1 7/2001 Simpson
D446,127 S 8/2001 Adee
D446,128 S 8/2001 Adee
D446,730 S 8/2001 Adee
D450,596 S 11/2001 Adee
6,312,364 B1 11/2001 Selsam
D463,977 S 10/2002 Castellanos
D471,766 S 3/2003 Bradley
D474,687 S 5/2003 Jones
D481,635 S 11/2003 Lovelace, Jr.
D484,364 S 12/2003 Bailey
6,662,960 B2 12/2003 Hong
6,695,162 B1 2/2004 Boukobza
6,698,606 B2 3/2004 Deubel
D492,593 S 7/2004 Dutton
6,763,969 B1 7/2004 Melrose
D494,463 S 8/2004 Tsao
D495,246 S 8/2004 Tomassetti
D504,326 S 4/2005 Vovan
6,929,139 B2 8/2005 Darr
D515,880 S 2/2006 Lerner
7,083,818 B2 8/2006 Pratte
D529,821 S 10/2006 Wilcox
D530,626 S 10/2006 Tanja
D531,054 S 10/2006 Sagel
D535,889 S 1/2007 Kaminski
D536,619 S 2/2007 Heisner
D537,633 S 3/2007 Marnell, II
D549,572 S 8/2007 Althouse
D557,635 S 12/2007 Ohgaku
D559,148 S 1/2008 Yamagishi
D562,127 S 2/2008 Croft

(56) References Cited

U.S. PATENT DOCUMENTS

D562,146 S 2/2008 Zboch
D568,164 S 5/2008 Dodge
D569,733 S 5/2008 Dodge
7,367,365 B2 5/2008 Slat
7,377,381 B2 5/2008 Dziaba
D571,228 S 6/2008 Maslowski
D573,038 S 7/2008 Picken
D577,577 S 9/2008 Lee
D579,769 S 11/2008 Lipinski
D585,746 S 2/2009 Dodge
D585,747 S 2/2009 Dodge
D585,755 S 2/2009 Dodge
7,568,588 B2 8/2009 Yourist
7,581,654 B2 9/2009 Stowitts
D609,576 S 2/2010 Kuzma
7,699,183 B2 4/2010 Matsuoka
D621,718 S 8/2010 Mehdizadeh
7,798,349 B2 9/2010 Maczek
D626,002 S 10/2010 Charyszyn
D627,217 S 11/2010 Marcinkowski
D634,619 S 3/2011 Fisher
7,959,024 B2 6/2011 Pedmo
D642,066 S 7/2011 Kuzma
D642,484 S 8/2011 Birchmeier
D642,937 S 8/2011 Birchmeier
D645,764 S 9/2011 Mathis
8,025,179 B2 9/2011 Miller
D647,792 S 11/2011 Mathis
8,069,986 B2 12/2011 Darr
D652,323 S 1/2012 Clark
8,113,370 B2 2/2012 Zhang
D655,136 S 3/2012 Goodman
D655,629 S 3/2012 Blanton
D659,000 S 5/2012 Kim
D664,434 S 7/2012 Kim
D669,368 S 10/2012 Ehrmann
D674,288 S 1/2013 Gieske
D681,474 S 5/2013 Gieske
8,474,638 B2 7/2013 Pedmo
8,540,095 B2 9/2013 Pedmo
D693,178 S 11/2013 Wilson
D696,136 S 12/2013 Gieske
D697,415 S 1/2014 Bryant
8,632,722 B2 1/2014 Porter
D701,430 S 3/2014 Hohnstein
D712,283 S 9/2014 Ehrmann
D713,742 S 9/2014 Dzikowicz, Jr.
D714,660 S 10/2014 Tilahun
D732,344 S 6/2015 Clark
D737,681 S 9/2015 Martinson
D750,976 S 3/2016 Tilahun
D769,132 S 10/2016 Tilahun
D773,940 S 12/2016 Tilahun
D780,599 S 3/2017 Tilahun
D798,166 S 9/2017 Tilahun
D798,738 S 10/2017 Tilahun
D822,506 S 7/2018 Tilahun
D839,751 S 2/2019 Troudt
D862,248 S 10/2019 Arendt
11,230,419 B2 1/2022 Tilahun
11,230,420 B2 1/2022 Tilahun
2001/0001674 A1 5/2001 Simpson
2002/0008106 A1 1/2002 Bezek
2002/0108955 A1 8/2002 Erb
2003/0185943 A1 10/2003 Bradley
2005/0061759 A1 3/2005 Doucette
2005/0068182 A1 3/2005 Dunlap
2005/0092644 A1 5/2005 Cafferata
2007/0178194 A1 8/2007 Everard
2007/0187264 A1 8/2007 Hofte
2008/0179271 A1 7/2008 Bangi
2009/0039079 A1 2/2009 Lipinski
2009/0142454 A1 6/2009 Clark
2009/0159483 A1 6/2009 Hinze
2009/0186132 A1* 7/2009 Mangino .................. B65D 1/36
206/541
2009/0301923 A1 12/2009 Van Puijenbroek
2010/0183775 A1 7/2010 Cudnohoske
2011/0027438 A1 2/2011 Finkowski
2011/0086141 A1 4/2011 Strilich
2011/0132916 A1 6/2011 Uptergrove
2011/0139650 A1 6/2011 Dworak
2012/0181246 A1 7/2012 Ross
2012/0267381 A1 10/2012 Trude
2012/0325770 A1 12/2012 Reeber
2013/0015091 A1 1/2013 Murray
2013/0025092 A1 1/2013 Ozawa
2013/0032604 A1 2/2013 Jamali
2013/0082024 A1 4/2013 Howell
2015/0360840 A1 12/2015 Tilahun
2020/0055654 A1 2/2020 Tilahun
2021/0047101 A1 2/2021 Tilahun

FOREIGN PATENT DOCUMENTS

CA 177342 S 9/2018
CA 182451 S 9/2018
CN 2491350 5/2002
CN 2543881 4/2003
CN 101600625 12/2009
CN 104781153 7/2015
EP 0488531 6/1992
EP 1942058 7/2008
FR 2058493 5/1971
FR 2562873 10/1985
FR 2855817 12/2004
GB 1406444 9/1975
GB 2451737 2/2009
JP H04352657 12/1992
JP 2009116171 5/2009
JP 2011240952 A 12/2011
JP 2012131559 7/2012
JP 6483025 3/2019
MX 360014 10/2018
WO 2010068593 A2 6/2010
WO 2014005023 A1 1/2014
WO 2014105712 A2 7/2014

OTHER PUBLICATIONS

Arendt, et al., Package. Pending U.S. Appl. No. 29/598,919, filed Mar. 29, 2017.
Convenience+ Meat+ Cheese+ Nuts = P3 Portable Protein Packs, available Mar. 11, 2014, [online], [site visited May 2, 2019]. Available from internet, URL: https://designertrapped.com/p3-portable-protein-packs/ (Year: 2014).
Easy After School Snacks for the Busy Family, available Oct. 19, 2017, [online], [site visited May 2, 2019]. Available from internet, URL: https://www.blessthismessplease.com/after-school-snacks-8/ (Year: 2017).
Examiner's Report, from related Canadian Industrial Design Application No. 177342, dated Apr. 13, 2018, 2 pages.
Examiner's Report, from related Canadian Industrial Design Application No. 182451, dated Aug. 2, 2018, 2 pages.
Fat Secret. Nutrition Facts Lunchables Ham & Cheddar Cheese with Crackers. Oct. 29, 2012. Retrieved from URL: < https://www.fatsecret.com/calories-nutrition/oscar-mayer/lunchables-ham-cheddar-cheese-with-crackers>.
First Examination Report, from related Australian Patent Application No. 2013370677, dated Dec. 8, 2016, 3 pages.
First Examination Report, from related Australian Patent Application No. 2017272261, dated Feb. 28, 2019, 6 pages.
First Examination Report, from related Australian Patent Application No. 2019229378, dated May 15, 2020, 4 pages.
First Office Action, from related Canadian Patent Application No. 2889003, dated Jan. 3, 2020, 4 pages.
First Office Action, from related Chinese Patent Application No. 201380058066.X, dated Sep. 12, 2016, 25 pages. (With English Translation).

(56) References Cited

OTHER PUBLICATIONS

First Office Action, from related Chinese Patent Application No. 201910241999.1, dated Dec. 20, 2019, 14 pages. (With English Translation).
First Office Action, from related Mexican Patent Application No. MX/a/2015/005682, dated Feb. 15, 2018, 4 pages. (With English Translation).
Fourth Office Action, from related Chinese Patent Application No. 201380058066.X, dated Jun. 4, 2018, 7 pages. (With English Translation).
Japanese Office Action, Office Action Dated Jan. 16, 2018 from related Japanese patent application No. 2015-550697, 14 pages.
Keebler Sargento Cheese Dip & Sticks, available Oct. 28, 2011, [online], according to an IDS dated Jul. 13, 2016, in U.S. Appl. No. 29/571,001.
Nabisco Handi-Snacks, available Jul. 7, 2013, [online], according to an IDS dated Jul. 13, 2016, in U.S. Appl. No. 29/571,001.
Nature Valley Protein Bars. Feb. 22, 2012. Retrieved from internet URL <https://forthemommas.com/coupons/nature-valley-protein-bars-coupon-save-1-1 O>.
New TraySkin film made specifically for poultry packaging, available Jan. 9, 2017, [online], [site visited May 2, 2019]. Available from internet, URL: https://www.packagingstrategies.com/articles/89395-new-trayskin-film-made-specifically-for-poultry-packaging (Year: 2017).
Notice of Acceptance, from related Australian Patent Application No. 2017272261, dated May 30, 2019, 3 pages.
Notice of Allowance of Patent, from related Korean Patent Application No. 10-2015-7011781, dated Apr. 20, 2020, 4 pages. (With English Translation).
Notice of Grant and allowed claims, from related Japanese Patent Application No. 2015-550697, dated Jan. 16, 2019, 8 pages. (With English Translation).
Notice of Non-Final Rejection, from related Korean Patent Application No. 10-2015-7011781, dated Jun. 28, 2019, 25 pages. (With English Translation).
Notice on Grant of Patent Right for Invention and allowed claims, from related Chinese Patent Application No. 201380058066.X, dated Jan. 15, 2019, 18 pages. (With English Translation).
Notification of Reasons for Refusal, from related Japanese Patent Application No. 2015-550697, dated Aug. 7, 2018, 4 pages. (With English Translation).
Office Action, from related Japanese Patent Application No. 2019-023876, dated Jan. 21, 2020, 9 pages. (With English Translation).
Office Action, from related Mexican Patent Application No. MX/a/2018/005103, dated May 18, 2021, 8 pages. (With English Translation).
Photos of Oscar Mayer Lunchables Jr. Snack Combinations—Twin Pack; believed to have been on sale and in public use in 2007.
Preliminary Office Action, from related Brazilian Patent Application No. 112015010297-2, dated Oct. 29, 2019, 7 pages. (With English Translation).
Second Examination Report, from related Australian Patent Application No. 2013370677, dated Dec. 12, 2017, 2 pages.
Second Office Action, from related Canadian Patent Application No. 2889003, dated Dec. 3, 2020, 5 pages.
Second Office Action, from related Chinese Patent Application No. 201380058066.X, dated May 25, 2017, 28 pages. (With English Translation).
Spanish Patent and Trade Mark Office; Grounds for the decision on national patent application No. 201590045, which is related to the instant application, dated Oct. 16, 2018; 7 pages. (With English Translation).
Spotted on shelves (Meat Edition), available Apr. 25, 2017, [online], [site visited May 2, 2019]. Available from internet, URL: https://www.theimpulsivebuy.com/wordpress/2017/04/25/spotted-on-shelves-meat-edition-4252017/ (Year: 2017).
Starbucks Coffee Company, Nov. 7, 2012. Retrieved from: <https://web.archive.org/web/20121107025439/http://www.starbucks.com:80/menu/food/bistro-boxes/protein>.
Susie Bautista. Nature Valley Protein Bars review. Apr. 27, 2012. Retrieved from URL: <http://flavorscientist.com/2012/04/27/nature-valley-1 DO-natural-protein-chewy-bars-review/>.
Third Office Action, from related Chinese Patent Application No. 201380058066.X, dated Nov. 1, 2017, 30 pages. (With English Translation).
Third Office Action, from related Canadian Patent Application No. 2889003, dated Aug. 3, 2022, 7 pages.

* cited by examiner 44
108
PROTEIN
PACK
50
42
74
80
46
58
48
40
66
68

40
42
44
46
48
50
52
54
56
58
60
62
64
66
68
70
72
74
82
$d_1$
$d_2$
$d_3$
α

82
42
44
74
60
58
46
62
40
48
64
66
50

104
42
58
68
44
46
48
66
50
104
80
40

82
40
60
58
62
68
42
44
72
46
48
64
50

40
42
44
46
48
60
62
64
66
74
82
106
$W_5$
$W_6$ 42
44
60
46
48

42
60
44
46
48

42
44
46
48
60

PACKAGED FOOD PRODUCT

CROSS-REFERENCE TO RELATED APPLICATIONS

This application is a continuation application of U.S. patent application Ser. No. 16/662,960, filed Oct. 24, 2019, which is a divisional application of U.S. patent application Ser. No. 14/655,678, filed Jun. 25, 2015, which is a National Stage Entry based on International Application No. PCT/US2013/076988, filed Dec. 20, 2013, which in turn claims the benefit of U.S. Provisional Patent Application No. 61/745,915, filed on Dec. 26, 2012, each of which is incorporated herein by reference in its entirety.

FIELD OF THE INVENTION

This application relates generally to food packaging, and more particularly to a packaged food product that may be displayed in an upright position.

BACKGROUND

Packaged food products include meal kits that contain various ready-to-eat ("RTE") food items to provide an essentially complete meal, as well as snack kits that contain fewer components and/or smaller quantities than meal kits. Such kits may include, for example, farinaceous items such as crackers and breads; proteinaceous items such as meats, nuts and cheeses; sauces; dips; dessert; beverages such as juice drinks; and/or other food and beverage items.

Upstanding packaged food products that comprise a tray with one or more cavities and a removable lid sometimes include a back card disposed generally parallel to the front wall to facilitate display of the package on a shelf in an upright position. Packaged food products also sometimes include a hanging feature such as a movable tab as shown, e.g., in U.S. Pat. No. 7,128,222. Such packages may be made of various materials as disclosed in U.S. Pat. No. 5,657,874, the disclosure of which is incorporated by reference herein.

Food items may be disposed in the cavities with or without wrappers or other packaging materials within the cavities. Some food items may be individually pre-packaged in film wrap, pouches or containers having removable lids. Beverages may be contained in a cup with a removable flexible lid secured in place by a peel seal; a flexible pouch, such as a tetrahedral pouch; a metal can; a plastic bottle with a screw top; or another type of container. To increase shelf life and stability, the cavities may be gas flushed to reduce or eliminate oxygen, and internal containers within the cavities may be gas flushed or vacuum sealed to reduce or eliminate oxygen.

In the past, some upstanding packaged food products of the types described above have proven to be somewhat unstable, or susceptible to tipping in response to minor disturbances. There remains a need for improvements in providing stability for such packages. Also, with a wide variety of packaged food products available at grocery stores, there is a continuing need for new and innovative impactful packaging that will enable a product to stand out in a positive way. In addition, there is a continuing need for improvements in handleability of food packaging.

SUMMARY

The packaged food product described below may incorporate an angled back card to improve stability by providing an enlarged footprint when the package is standing upright, i.e., vertically oriented. The angled back card can provide a wider base of support between the front of the product and the back card to improve the ability of the package to be self-supporting in an upright position, i.e., to stand up reliably on a shelf without leaning on other structures for external support.

The packaged food product may be generally dumbbell-shaped as viewed from the front and/or from other angles, and may comprise a center portion that is narrower and/or shallower than adjacent end portions. This may facilitate handling of the product by the consumer. That is, the recessed midsection of the tray design can help to provide an intuitive, secure and comfortable way of holding the product. Providing a reduced area to hold the package can result in a slimmer/leaner feel. This shape also may help to provide the product with an impactful appearance and theme at retail when the product is viewed from the front and/or from other angles. The product may include high-protein food items, consistent with the theme established by the shape. For example, in some embodiments, diced meat, nuts, and diced cheese components may be placed in bottom, middle and top compartments, respectively. The package may include prominently-displayed information about the protein content of the food items.

In some embodiments, the packaged food product may comprise three cavities or compartments, arranged in a vertical row. The compartment(s) on which the back card rests, the side seal widths, and the draft angle of the bottom compartment are designed to provide good standability, product access and product view without making the compartments empty-looking.

The invention compartments preferably are proportioned to the amount of product. In some embodiments, the product is dimensioned to be convenient for different sizes of hands. In some embodiments, the product is stackable with other like products, and is suitable for display in various ways, e.g., in (1) a self-supported upright or vertical orientation; (2) an upright orientation in which the product leans on other like products or on a wall or other structure in a horizontal stack or array, with the back of a product at the front of the array engaging the front of an adjacent product behind it, etc.; or (3) a flat or horizontal configuration.

In some embodiments, the flange may have a small return lip dimension of, e.g., 2 to 2.5 mm, and a small flange width of, e.g., 5 to 6 mm to enhance standability of the package with or without a back card. In some embodiments the product is both standable and peggable. Peggability may be achieved by extending the seal flange at the top of the package and including a peg hole in the extension. Alternatively, or in addition, the back card can be extended to the top or the side of the package to be used for pegging purpose.

In some embodiments, the product is a single item. In other embodiments, the product comprises a multipack.

Also described below are methods of making packaged food products in a high-speed, high-efficiency commercial operation, and methods of displaying such products.

In some embodiments, the methods may facilitate precise placement of the back card by providing a surface on the lower side of a compartment, such as a top compartment, that will restrict the back card from moving in the direction of that compartment. More specifically, a notch or shelf can be built in into the bottom side of the top compartment to provide a guide for the back card during assembly.

In some embodiments, the packaged food product comprises a rigid thermoformed tray comprising a flange and at least one cavity, and a lid sealed to the tray. A food product is disposed within the at least one cavity or cavities. Each cavity has one or more side walls and a rear wall that is angled relative to the flange. A back card extends along and beyond the rear wall. The back card is oriented so that so that the packaged food product is capable of being displayed on edge with the bottom end of the flange and the bottom end of the back card stably supporting the packaged food product on a horizontal surface. The bottom end of the back card is spaced from the flange by a greater distance than the upper end of the back card to provide an enlarged footprint for the packaged food product. The rear wall may be oriented at an angle of, e.g., 5° to 40° or 15° to 30° relative to the flange. The back card may have a front surface flush against and/or affixed to the angled rear wall of a first cavity or compartment, and an upper end abutting a bottom wall of a second cavity or compartment thereabove. The bottom wall of the second compartment may have a stabilizing surface such as a groove or a shelf engaging a portion of the back card. Where a groove or notch is provided, it is desirable that it be sufficiently shallow that it does not prevent efficient manufacture of the tray in a high speed molding process such as a thermoforming or vacuum forming operation. A portion of the back card may extend upward beyond the upper cavity and may have an opening above the upper cavity to facilitate hanging the packaged food product from a peg.

The tray may comprise a first portion comprising at least one cavity and a second portion comprising at least one cavity, and an area of weakness therebetween to facilitate separation of the first portion from the second portion. Some or all of the compartments may be gas flushed to reduce or eliminate oxygen therein. The lid may comprise a flexible film having moisture-barrier and oxygen-barrier properties. The product may have a generally dumbbell-shaped front surface that has information prominently displayed thereon referring to protein content, and the food product comprises one or more proteinaceous food products such as cheeses, meats and nuts. The tray may comprise an upper cavity, a lower cavity, and a middle cavity therebetween. The middle cavity may be narrower and shallower than the upper and lower cavities. In some embodiments, the mass of the food product in the upper compartment may be less than the mass of the food product in the lower compartment to enhance stability. In other embodiments, the mass of the food product in the upper compartment may be equal to or greater than the mass of the food product in the lower compartment, and the angled back card may provide sufficient stability notwithstanding the higher center of gravity associated with this arrangement.

In some embodiments, the packaged food product comprises first and second rigid thermoformed trays, each comprising a flange and at least one cavity, each of the cavities having one or more side walls and a rear wall that is angled relative to the flange, food products disposed within the cavities, and means for enclosing the food products within the cavities. One or more back cards may extend along and beyond at least one of the rear walls. The back card(s) may be oriented so that the lower ends of the flanges and of the back card(s) stably support the packaged food product on a horizontal surface, with the lower end(s) of the back card(s) being spaced from the flanges by a greater distance than the upper end of the back card(s) to provide an enlarged footprint for the packaged food product. The compartments may be gas flushed to reduce or eliminate oxygen therein. The means for enclosing the food products within the cavities may comprise a first film lid hermetically sealed to the flange of the first tray and a second film lid hermetically sealed to the flange of the second tray. Alternatively, the means for enclosing the food products within the cavities may comprise a single film lid having a first portion hermetically sealed to the flange of the first tray and a second portion hermetically sealed to flange of the second tray. In this arrangement, the film lid may have an area of weakness to facilitate separation of the first portion from the second portion.

The back card(s) may comprise a one or more back cards engaging only the first tray, and/or one or more back cards engaging only the second tray, or may comprise a single back card having a first portion engaging the first tray and a second portion engaging the second tray, with an area of weakness between the first and second portion to facilitate separation of the first portion from the second portion. Each back card may be affixed to the rear wall of a middle compartment. The rear walls and back cards may be oriented at an angle of 5° to 40° or 15° to 30° relative to the flanges. Each tray may also comprise an upper compartment or cavity that has a stabilizing surface such as a shallow groove or a shelf engaging an upper end of one or more of the back cards. Alternatively, a portion of one or more of the back cards may extend upward beyond the upper cavity and may have an opening above the upper cavity to facilitate hanging the packaged food product from a peg.

In some embodiments, the packaged food product comprises a tray comprising a flange and at least one compartment or cavity; a proteinaceous food product disposed within the compartment(s); and a generally dumbbell-shaped lid enclosing the food product within the compartment(s). The lid may have information prominently displayed thereon concerning protein content of the food product. The tray may be thermoformed, and may comprise an upper cavity, a lower cavity, and a middle cavity therebetween. The middle cavity may be narrower and/or shallower than the upper and lower cavities. A first proteinaceous food product may be disposed within the upper cavity. A second proteinaceous food product may be disposed within the middle cavity. A third proteinaceous food product may be disposed within the lower cavity. A back card may extend along and beyond at least one of the rear walls. The back card may have an upper end and a lower end, and may be oriented so that the lower ends of the flange and of the back card stably support the packaged food product on a horizontal surface, with the lower end of the back card extending downward and rearward of the lower compartment and being spaced from the flange by a greater distance than the upper end of the back card to provide an enlarged footprint for the packaged food product.

The middle cavity may have an angled rear surface oriented at an angle of 5° to 40° or more specifically an angle of 15° to 30° relative to the flange. The back card may be flush with and attached to the angled rear surface. The upper cavity may have a stabilizing surface that comprises a shallow groove or a shelf or other structure engaging a portion of the back card. A portion of the back card may extend upward or laterally beyond the tray and may have an opening to facilitate hanging the packaged food product from a peg. The cavities may be gas flushed to reduce or eliminate oxygen therein. The food products may be cheeses, meats, nuts, and/or other products. The mass of the food product in the upper compartment may be less than the mass of the food product in the lower compartment. The flange of the tray may define a plane. The upper compartment may have a greater depth than the lower compartment. The distance from the plane of the flange to the bottom end of the angled back card may equal to the depth of the upper compartment, such that in addition to being displayed in upright orientations, the product may be displayed in a horizontal or flat configuration in which it is supported by the rear surface of the top compartment and by the lower end of the back card.

In some embodiments, a method of packaging a food product in a high-speed commercial packaging operation may comprise:

(a) forming a tray with a flange and at least one cavity having an angled rear surface;

(b) placing a food product in the package;

(c) placing a film over the tray;

(d) sealing the food product in at least one cavity;

(e) placing a rigid angled back card on the angled rear surface in a position that will enable the packaged food products to be stably self-supporting in an upright orientation on a generally horizontal surface with an edge of the flange contacting the generally horizontal surface, and with the back card extending down and away from the angled rear surface to contact the generally horizontal surface; and (f) repeating steps (a) through (e) to form a plurality of additional packaged food products.

Steps (a) through (f) may be performed in line in a single efficient high-speed operation. Alternatively, one or more steps, such as forming the trays, may be performed off-line. Where the trays are formed off-line, they may be supplied to a filling and sealing line in stacks, nested together.

Placing the rigid angled back card on the rear surface may comprise use of an adhesive or other means to affix the back card to the rear surface, and may further comprise affixing the back card to more than one compartment. In some embodiments, the tray may have two lower compartments with coplanar angled rear surfaces, and an upper compartment with a lower surface that has a stabilizing feature such as a notch, groove or shelf for receiving an upper end of the back card.

Additional steps, such as a gas-flush step, may be included in the process. The process may also include joining the packaged food products in pairs, wherein placing the rigid angled back card on the angled rear surface comprises placing a single rigid angled back card on rear surfaces of two trays.

After forming, filling and sealing the packages and attaching back cards, the resulting packaged food products may be transported to retail locations and placed on horizontal shelves in upright and vertical positions in which they are stable and self-supporting. Alternatively, they may be displayed in other ways, e.g., on shelves in upright positions in which they lean on adjacent products or other structures; on shelves in flat or horizontal positions; or on pegs, suspended from a top or side hang tab in an upright or sideways position.

The term "back card" as used herein refers to any panel or similar item. The back cards described herein may be made of any suitable material such as, by way of example and not by way of limitation, card stock, paperboard, polymeric materials, or laminates which may include one or more layers of the above materials and/or other materials such as metal foils and the like.

DETAILED DESCRIPTION

Figure 1:
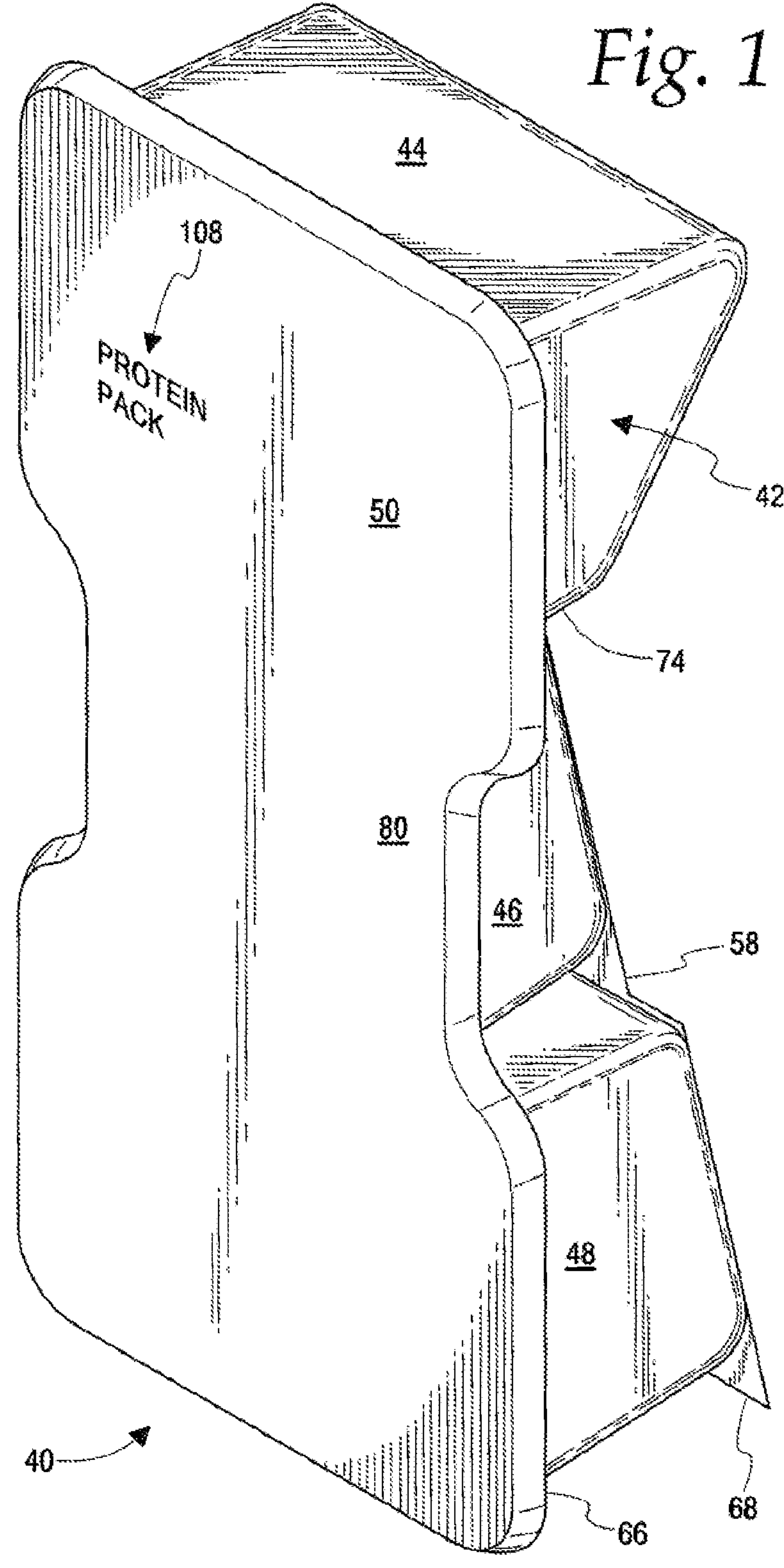
FIG. 1 is a perspective view of a packaged food product in accordance with a first embodiment.
Figure 3:
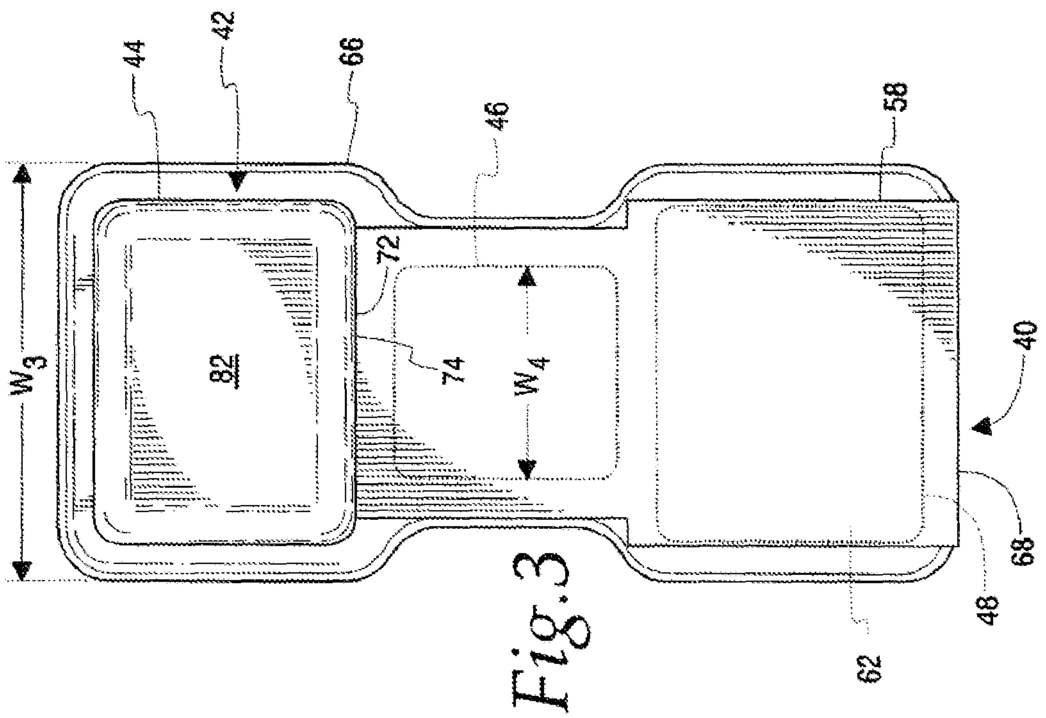
FIG. 3 is a rear elevation view thereof.
Figure 2:
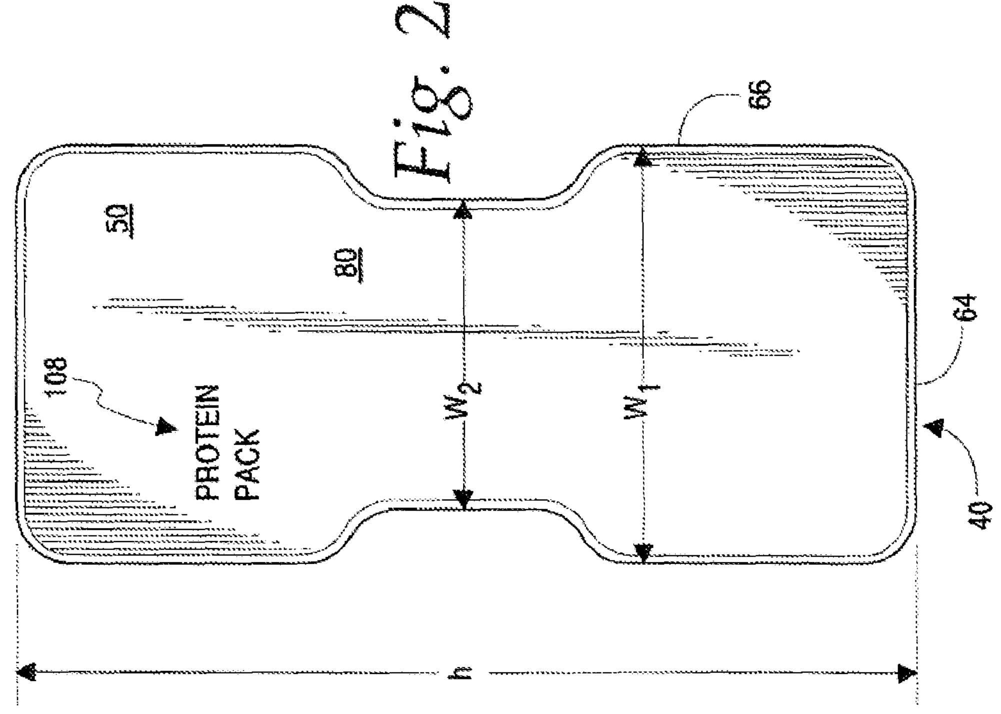
FIG. 2 is a front elevation view thereof.

In a first embodiment, illustrated in FIG. 1-7, there is provided a packaged food product 40 that comprises a rigid thermoformed tray 42 comprising one or more cavities or compartments, specifically an upper compartment 44, an intermediate compartment 46, and a lower compartment 48; and a lid 50 sealed to the tray. Food products 52, 54 and 56 (shown in FIG. 4) are disposed within the cavities.

Figures 4, 5, 6, 7:
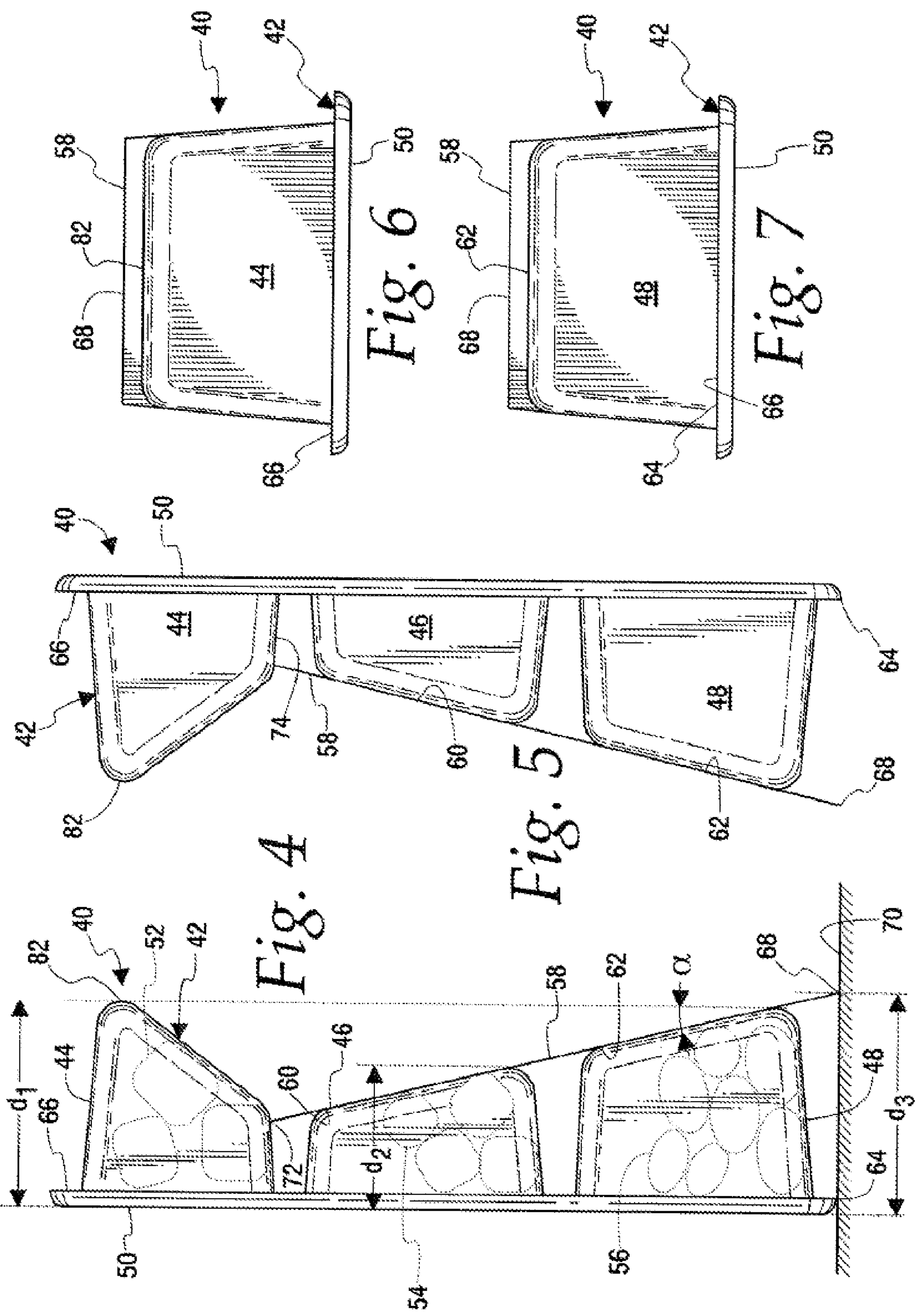
FIG. 4 is a right side elevation view thereof.
FIG. 5 is a left side elevation view thereof.
FIG. 6 is a top plan view thereof.
FIG. 7 is a bottom plan view thereof.

Each cavity has one or more side walls and a rear wall. A back card 58 extends along and beyond coplanar rear walls 60 and 62 of the intermediate and lower compartments. The back card 58 is oriented so that so that the packaged food product is capable of being displayed on edge with the bottom end 64 of the flange 66, and the bottom end 68 of the back card 58 stably supporting the packaged food product on a horizontal surface 70 (FIG. 4).

The bottom end 68 of the back card extends downward and rearward from the rear surface of the bottom compartment parallel to the plane of the rear wall of the bottom compartment or cavity to provide an enlarged footprint for the packaged food product. The rear walls 60, 62 and back card 58 may be oriented at an angle $\alpha$ of 5° to 40° or 15° to 30° relative to the flange 66.

Figures 8, 9, 10:
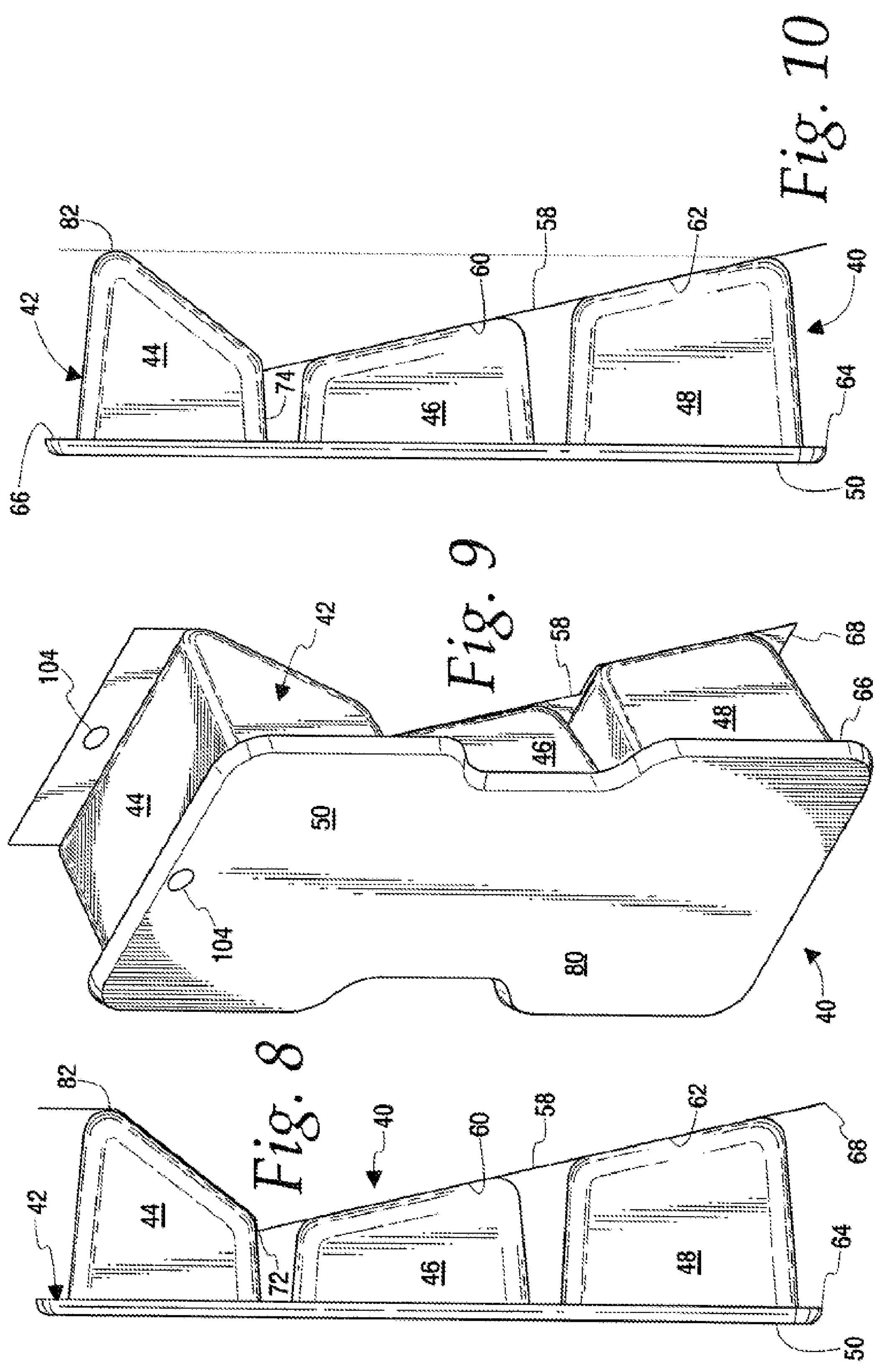
FIG. 8 is a right side elevation view of a packaged food product in accordance with a second embodiment.
FIG. 9 is a perspective view thereof.
FIG. 10 is a right side elevation view of the packaged food product of FIG. 1.
Figure 12:
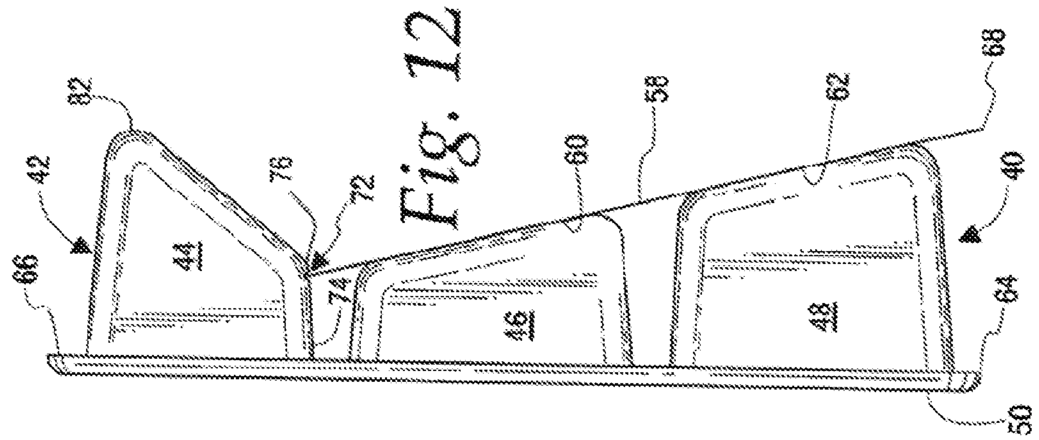
FIG. 12 is a right side elevation view of a fourth embodiment.
Figure 11:
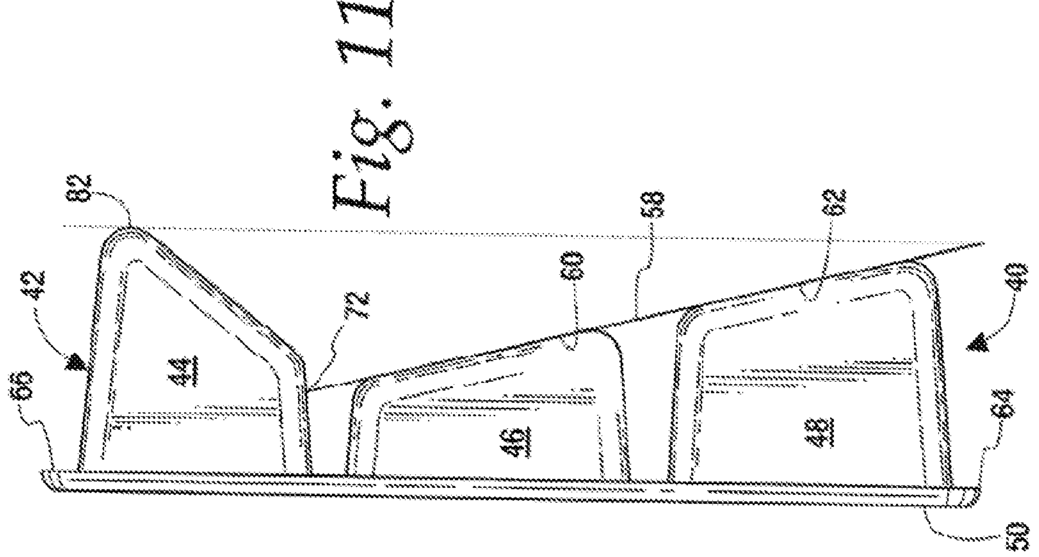
FIG. 11 is a right side elevation view of a third embodiment.

The back card 58 has front surface portions flush against and affixed by adhesives and/or other means to the angled rear walls 60 and 62 of the intermediate and lower compartments. The back card further has an upper end 72 abutting a bottom wall 74 of the upper compartment. The bottom wall of the second compartment may have a stabilizing surface 76 such as a shallow groove or a shelf, shown in FIG. 12, engaging the upper end or another portion of the back card. In other embodiments, an example of which is illustrated in FIGS. 8 and 9, a portion of the back card 58 may extend upward beyond the upper cavity and may have an opening 104 above the upper cavity to facilitate hanging the packaged food product from a peg. Alternatively, the back card may extend laterally beyond the tray and have an opening to facilitate pegging of the product.

Some or all of the compartments 44, 46 and 48 may be gas flushed to reduce or eliminate oxygen therein. The lid may comprise a flexible film having moisture-barrier and oxygen-barrier properties.

To facilitate handling and to communicate information or a thematic concept, the product of claim 1 has a generally dumbbell-shaped front surface 80, with the middle cavity 46 being narrower and shallower than the upper and lower cavities. In keeping with the concept of the product, the front surface has information 108 prominently displayed thereon which may refer to protein content, e.g., the words "Protein Pack," or to the amount of protein contained in the product. The food product may comprise one or more proteinaceous food products such as diced cheese 52, diced meats 54 and nuts 56 that in the aggregate contain a significant amount of protein. By way of example and not by way of limitation, the amount of protein in some embodiments may be, e.g., about 5 to 20 grams; about 12 to 14 grams; or about 13 grams, and the amount of protein may be communicated by text and/or graphics prominently displayed on the front surface 80, or otherwise included on the package. Other text, graphics, colors, etc. may also be included on any of the package surfaces to provide brand information, ingredient information, nutritional information, to make the package attractive, or for other reasons.

In some embodiments, the mass of the food product in the upper compartment may be less than the mass of the food product in the lower compartment to enhance stability. In other embodiments, the mass of the food product in the upper compartment may be equal to or greater than the mass of the food product in the lower compartment, and the angled back card may provide sufficient stability notwithstanding the higher center of gravity associated with this arrangement.

Figures 18, 19:
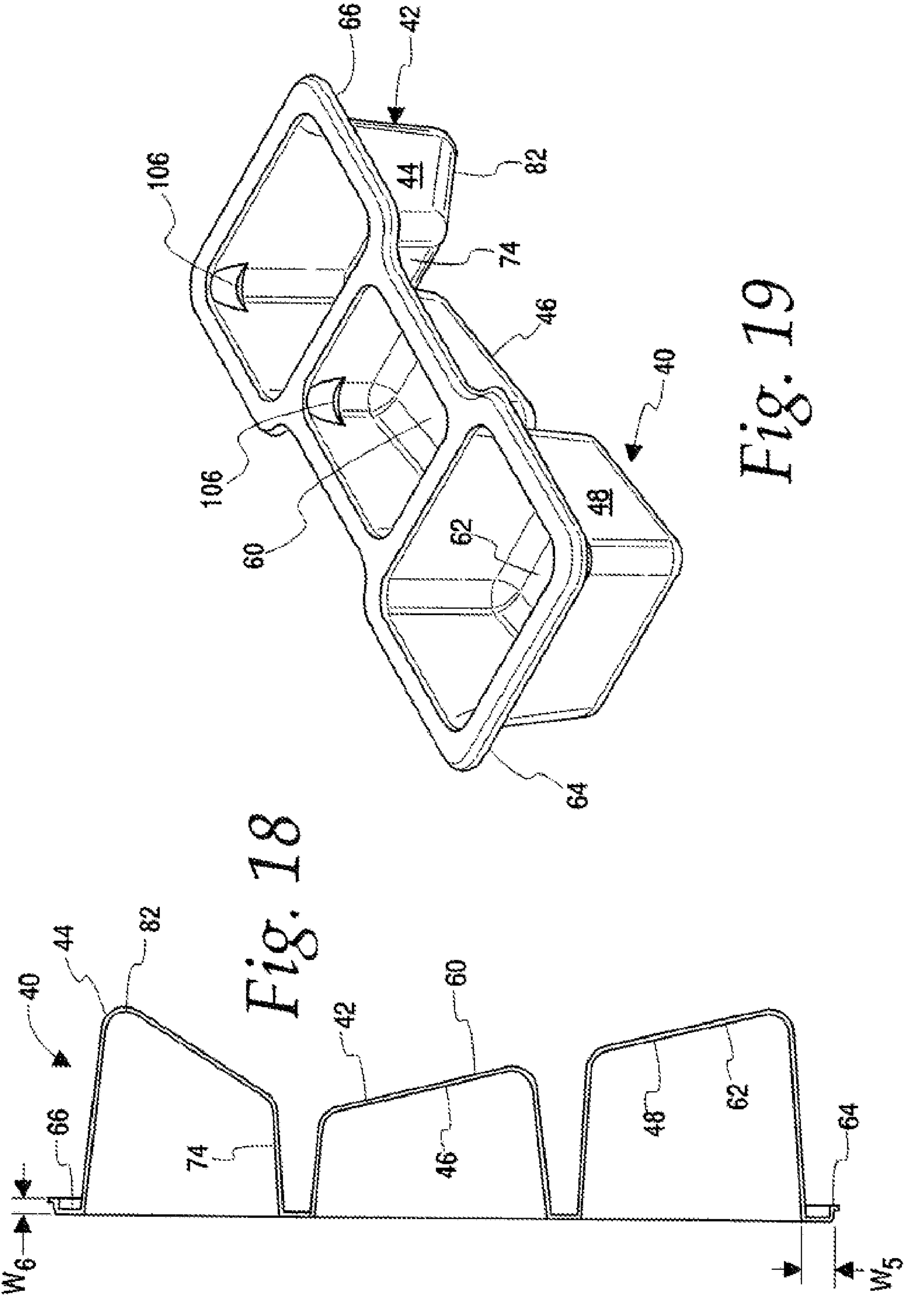
FIG. 18 is a right side cross-sectional elevation view of the tray of FIG. 1.
FIG. 19 is an isometric view of a ninth embodiment.

The product is preferably sized and shaped so that it has good handling characteristics. To this end, the tray 42 in some embodiments has a height "h" of 3 in. to 10 in., or 6 in. to 7 in.; a maximum width of 2 to 5 in., or 3 to 4 in.; a reduced central width "$W_2$;" a depth "$d_1$" of about 1 in. to 4 in., or 2 in. to 3 in.; and a reduced central depth "$d_2$" that is less than $d_1$. The back card 58 in some embodiments extends downward and rearward from the lower compartment, in some embodiments providing the product with an increased depth "$d_3$" which is greater than $d_1$ at its bottom. In some embodiments, each of the upper and lower compartments 44 and 48 has a width "$W_3$," and the middle compartment has a reduced width "$W_4$" which is less than $W_3$. In the interest of promoting stability, the flange width "$W_5$" and flange return dimension "$W_6$" (shown in FIG. 18) are both preferably fairly small. In some embodiments, the flange width $W_5$ may be, e.g., 5 to 6 mm., and the flange return dimension $W_6$ may be, e.g., 0 to 5 mm. or 2 to 3 mm.

FIGS. 8 and 9 illustrate an embodiment which is similar to that of FIG. 1 except as noted below. In the embodiment of FIGS. 8 and 9, the back card 58 extends upward over and beyond the upper compartment 44 across its entire width, and peg openings 104 are provided in the lid 50, flange 66 and back card 58. In other similar embodiments, the back card may extend vertically beyond the upper edge of the flange, and a single peg opening may be provided in the back card only. Also, the width of the back card may be reduced near its upper end in other embodiments.

FIG. 10 illustrates an embodiment similar to that of FIG. 1, except that the depth of the lower compartment 48 in the embodiment of FIG. 10 is less than that of the upper compartment 44, and the depth of the product at its bottom, i.e., the distance from a plane defined by a front surface of the flange to the bottom/rearward end 68 of the back card is equal to the depth of the upper compartment 44. The configuration of FIG. 10 may facilitate compact stacking and display of food products 40 in upright, flat or other orientations. For example, a stack of horizontally oriented products like that shown in FIG. 10 may be more stable, absent significant deflection of the back card due to stacking loads. However, the stability of the embodiment of FIG. 10 may not be as great as that of the embodiment of FIGS. 1-7 due to the decreased depth at the bottom or base. Also, prior to attachment of the back card, if the tray of FIG. 10 is resting on the rear wall 82 of upper compartment 44 and rear wall 62 of lower compartment 48, the flange 66 will not be horizontal, which may complicate high speed filling and sealing of the trays.

Figure 13:
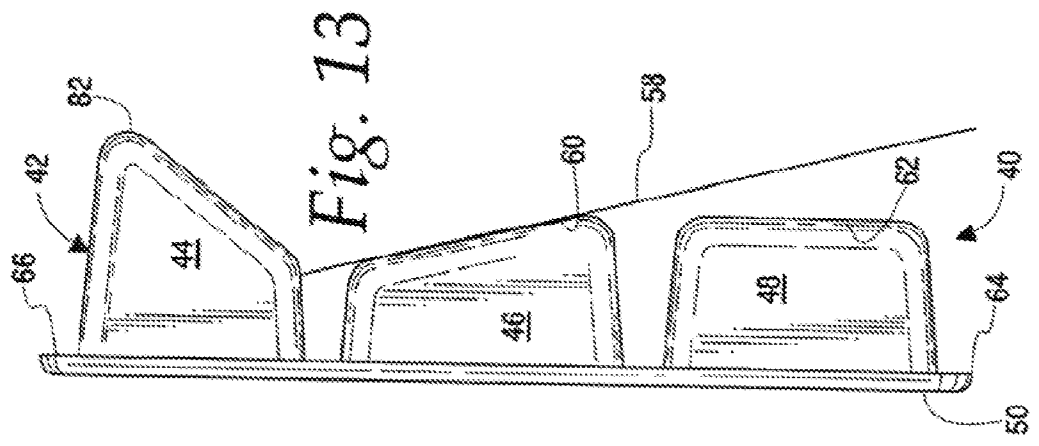
FIG. 13 is a right side elevation view of a fifth embodiment.

As shown in FIG. 13, the back card need not be adhered to both the intermediate and lower compartments 46 and 48, but rather may be adhered only to the intermediate compartment 46, and may be spaced from the lower compartment 48.

Figure 14:
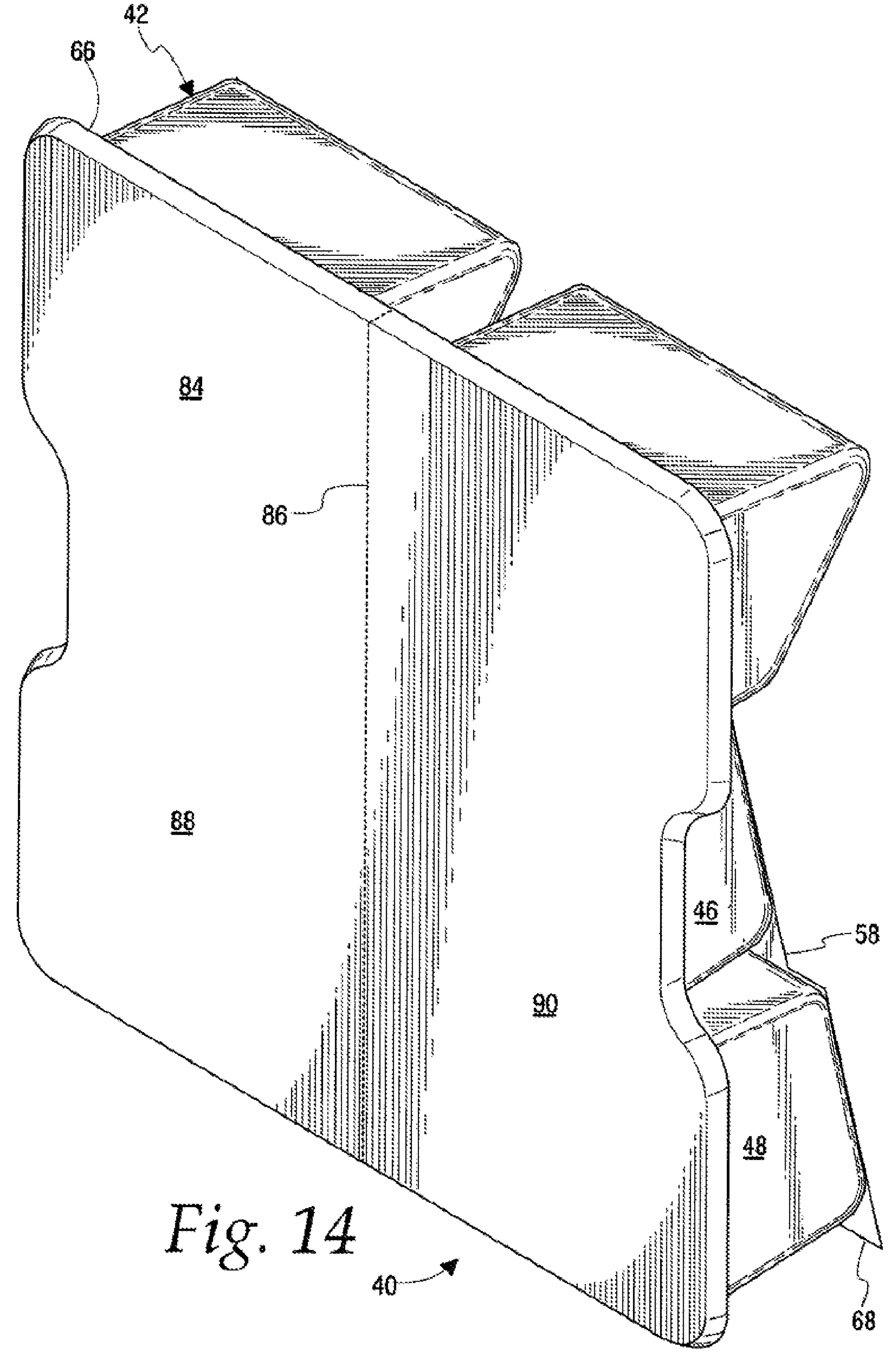
FIG. 14 is a perspective view of a sixth embodiment.
Figure 15:
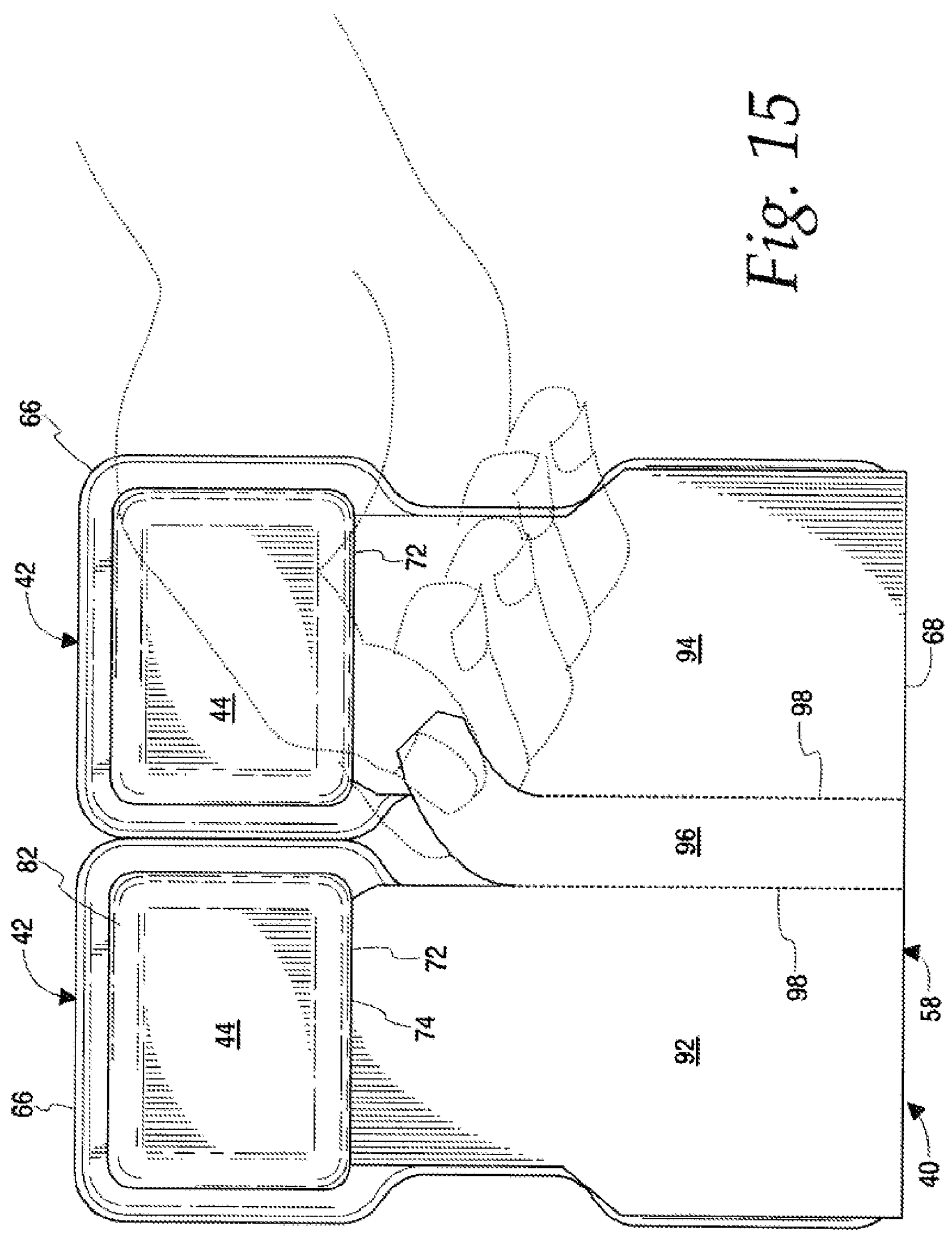
FIG. 15 is a rear elevation view thereof.
Figure 20:
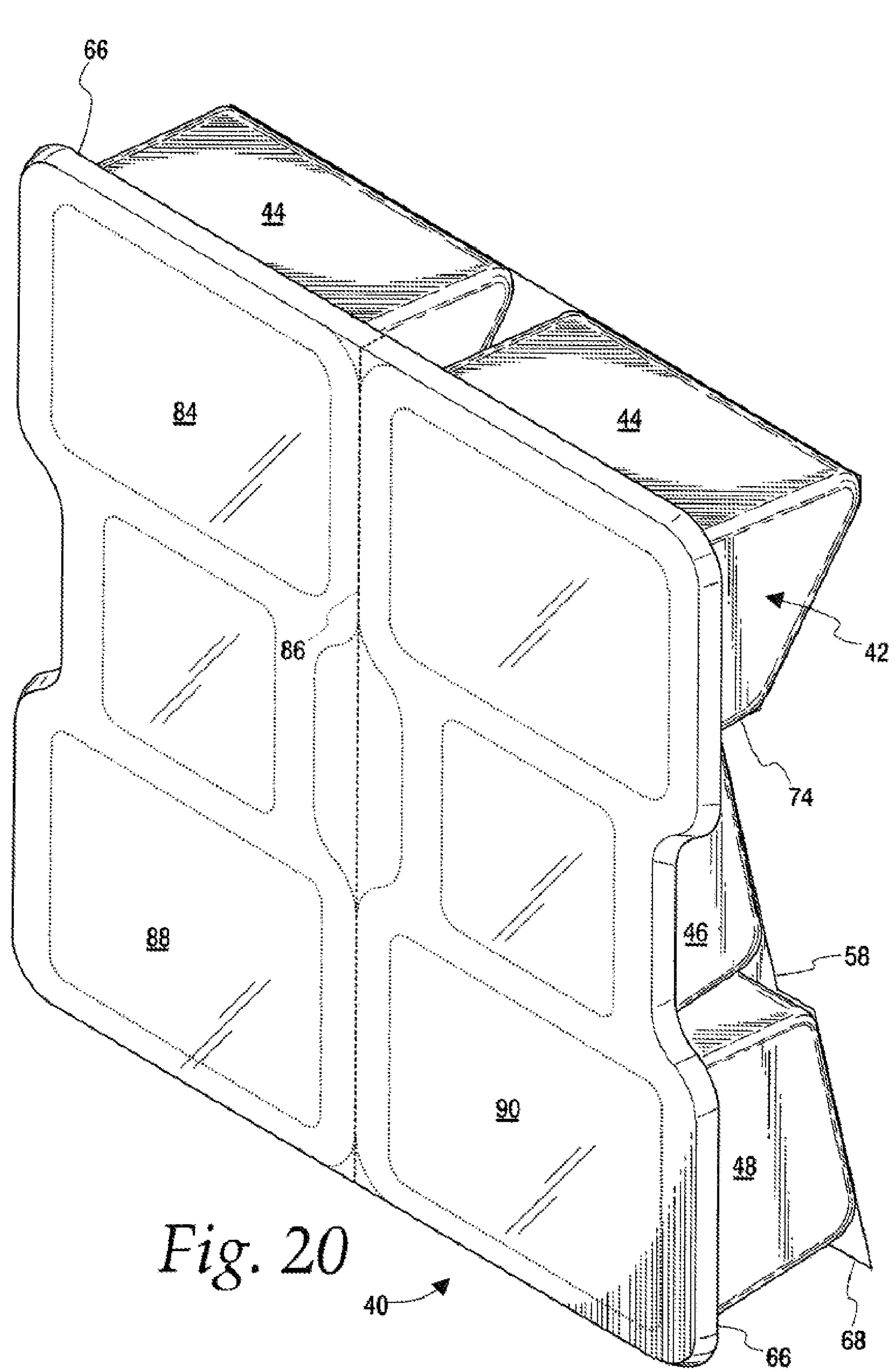
FIG. 20 is an isometric view of a tenth embodiment identical to that of FIG. 14, but with a transparent lid.

FIGS. 14, 15 and 20 illustrate a "multipack" packaged food product that comprises first and second trays 42 similar to those described above, each comprising a flange 66 and at least one cavity. The means for enclosing the food products within the cavities may comprise a first film lid hermetically sealed to the flange of the first tray and a second film lid hermetically sealed to the flange of the second tray. Alternatively, or additionally, the means for enclosing the food products within the cavities may include a single opaque (FIG. 14) or transparent (FIG. 20) film lid 84 having a first portion 88 covering the first tray and a second portion 90 covering the second tray. Provision of a transparent lid, as shown in FIG. 20, provides an advantage in that it may enable the underlying trays, food products contained therein, and/or graphics, text, etc. on underlying surfaces, to be viewed therethrough. The film lid 84 may have an area of weakness 86 such as a perforation to facilitate separation of the first portion from the second portion.

In multipack embodiments, the back card 58 may comprise a single back card having a first portion 92 engaging the first tray and a second portion 94 engaging the second tray, with an area of weakness 96 between the first and second portion to facilitate separation of the first portion from the second portion. The area of weakness 96 may comprise a removable strip of material defined by a pair of parallel vertical perforations 98. A portion of one or more of the back cards may extend upward beyond the upper cavity and may have an opening above the upper cavity to facilitate hanging the packaged food product from a peg.

Figure 16:
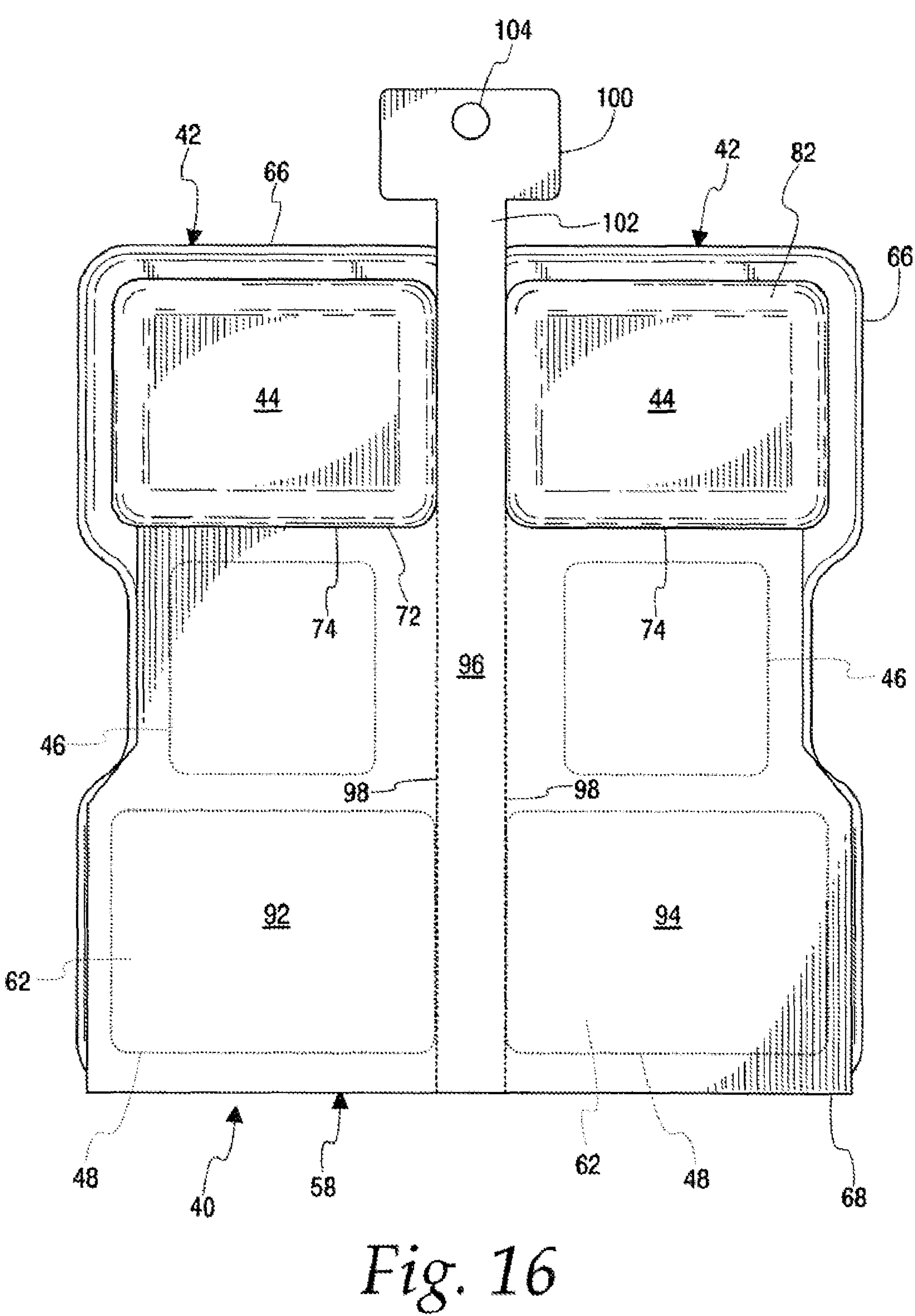
FIG. 16 is a rear elevation view of a seventh embodiment which is similar to that of FIG. 14 except as shown.
Figure 17:
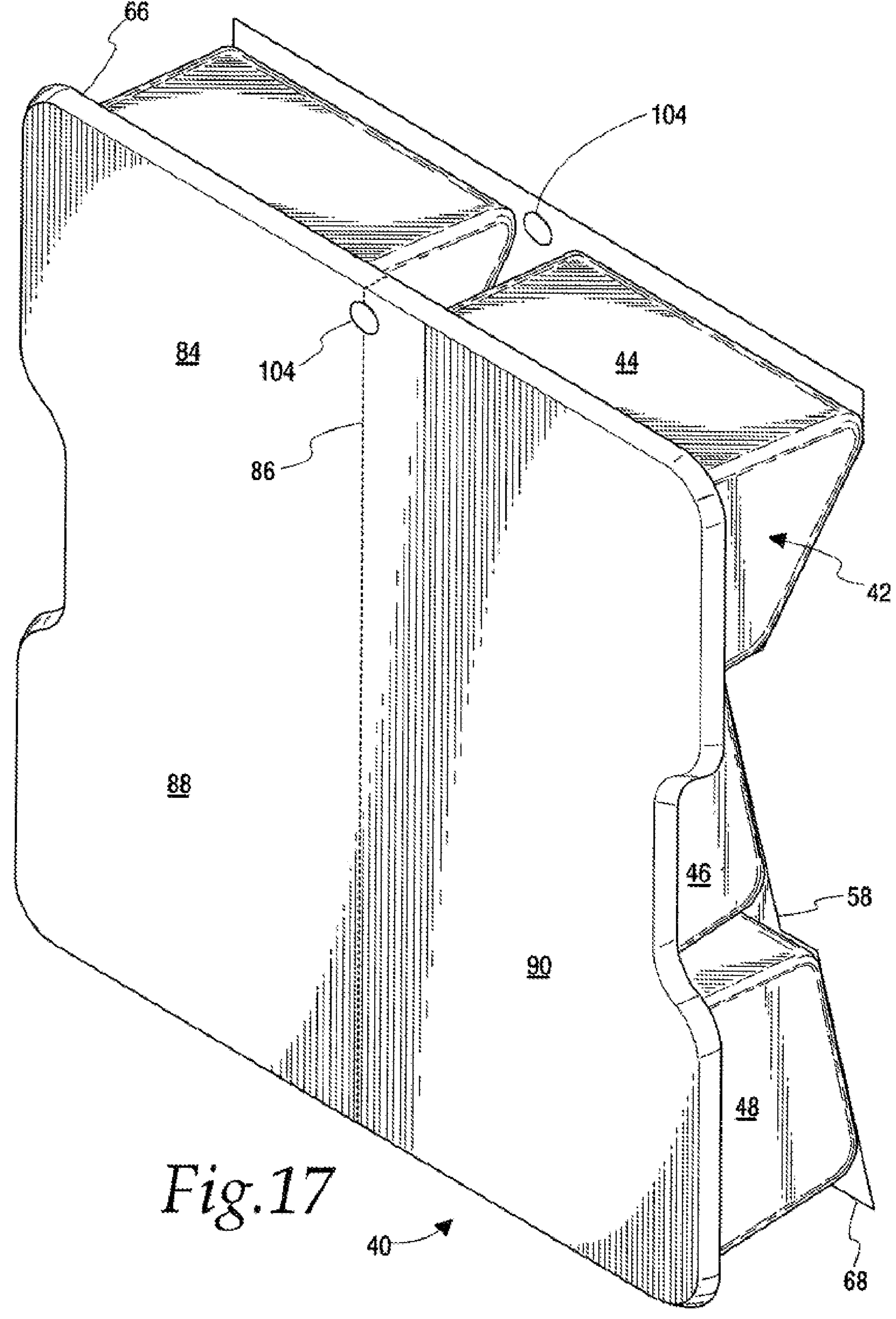
FIG. 17 is an isometric view of an eighth embodiment.

FIGS. 16 and 17 illustrate further embodiments which are similar to that of FIGS. 14 and 15 except as noted below.

In the embodiment of FIG. 16, a hang tab 100 with a peg opening 104 is provided on an extension 102 of removable strip 96, extending upward between the upper compartments 44. The hang tab 100 may have an enlarged head to facilitate handling and provide additional strength and durability at around the opening.

In the embodiment of FIG. 17, the back card extends upward over and beyond the upper compartments 44 across its entire width, and peg openings 104 are provided in the lid 50 and the back card 58.

Figure 21:
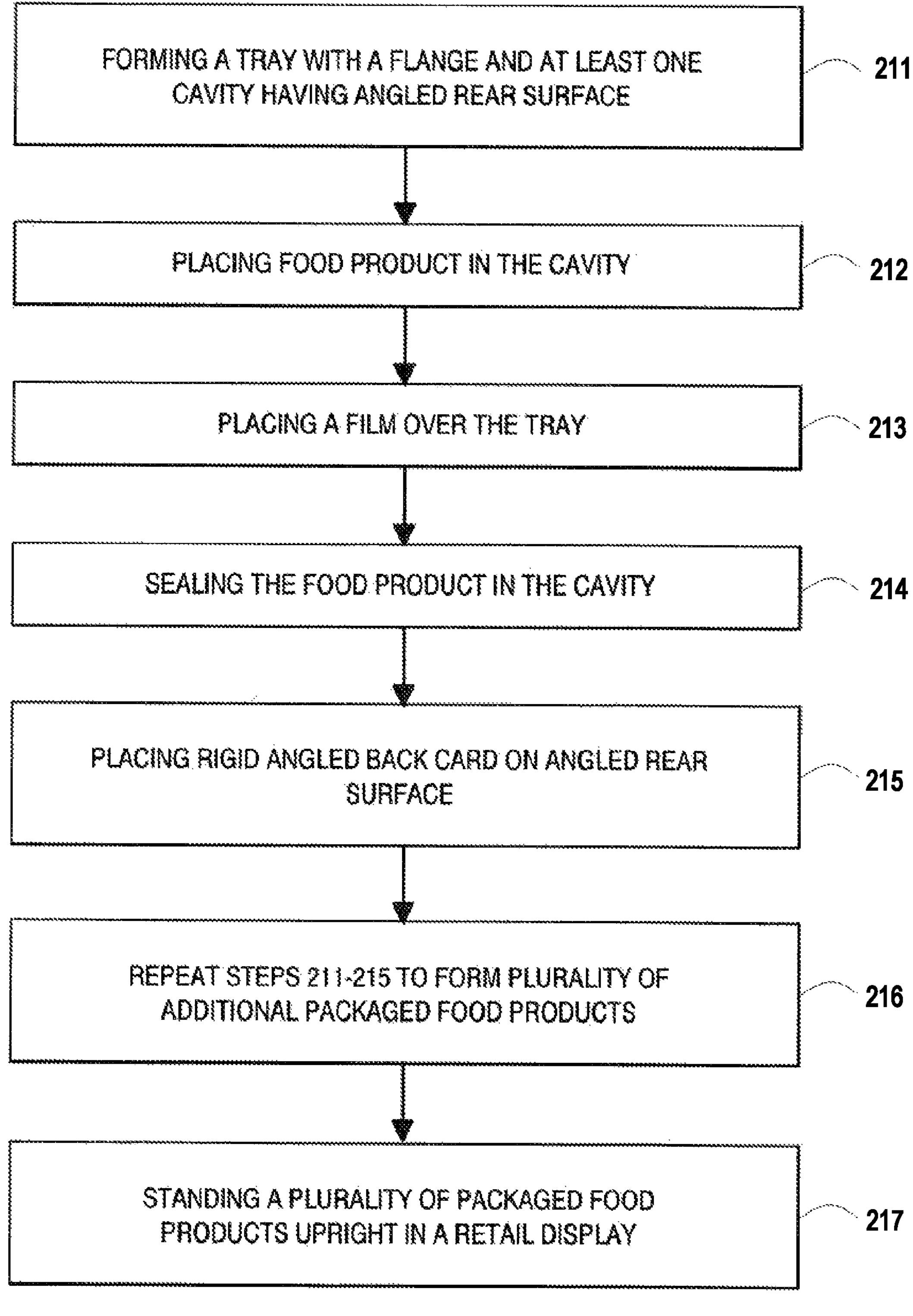
FIG. 21 is a flow chart illustrating a method of making and displaying packaged food products.

FIG. 21 illustrates a method of packaging and displaying a food product in a high-speed commercial packaging operation comprising the following steps (a)-(f) 211-216:

(a) forming 211 a tray with a flange and at least one cavity having an angled rear surface;

(b) placing 212 a food product in the cavity;

(c) placing 213 a film over the tray;

(d) sealing 214 the food product in at least one cavity;

(e) placing 215 a rigid angled back card on the angled rear surface in a position that will enable the packaged food products to be stably self-supporting in an upright orientation on a generally horizontal surface with an edge of the flange contacting the generally horizontal surface, and with the back card extending down and away from the angled rear surface to contact the generally horizontal surface;

(f) repeating 216 steps (a) through (e) to form a plurality of additional packaged food products; and (g) standing 217 a plurality of packaged food products upright in a retail display.

Step (b) may take place with the tray in a generally horizontal position, rotated 90° clockwise from the position of FIG. 4, with the rear of the tray resting on a conveyor.

Steps (a) through (f) may be performed in line in a single efficient high-speed commercial operation. Alternatively, one or more steps, such as forming the trays, may be performed off-line. Where the trays are formed off-line, they may be supplied to a filling and sealing line in stacks, nested together with stacking legs 106 (FIG. 19) provided to facilitate de-nesting.

Placing the rigid angled back card on the rear surface may comprise use of an adhesive or other means to affix the back card to the rear surface, and may further comprise affixing the back card to more than one compartment. In some embodiments, the tray may have two lower compartments with coplanar angled rear surfaces, and an upper compartment with a lower surface that has a stabilizing feature such as a notch, groove or shelf for receiving an upper end of the back card.

Additional steps, such as a gas-flush step, may be included in the process. The process may also include joining the packaged food products in pairs, wherein placing the rigid angled back card on the angled rear surface comprises placing a single rigid angled back card on rear surfaces of two trays.

After forming, filling and sealing the packages and attaching back cards, the resulting packaged food products may be transported to retail locations and placed on horizontal shelves in upright and vertical positions in which they are stable and self-supporting. Alternatively, they may be displayed in other ways, e.g., on shelves in upright positions in which they lean on adjacent products or other structures; on shelves in flat or horizontal positions; or on pegs, suspended from a top or side hang tab in an upright or sideways position.

Figures 22, 23, 24:
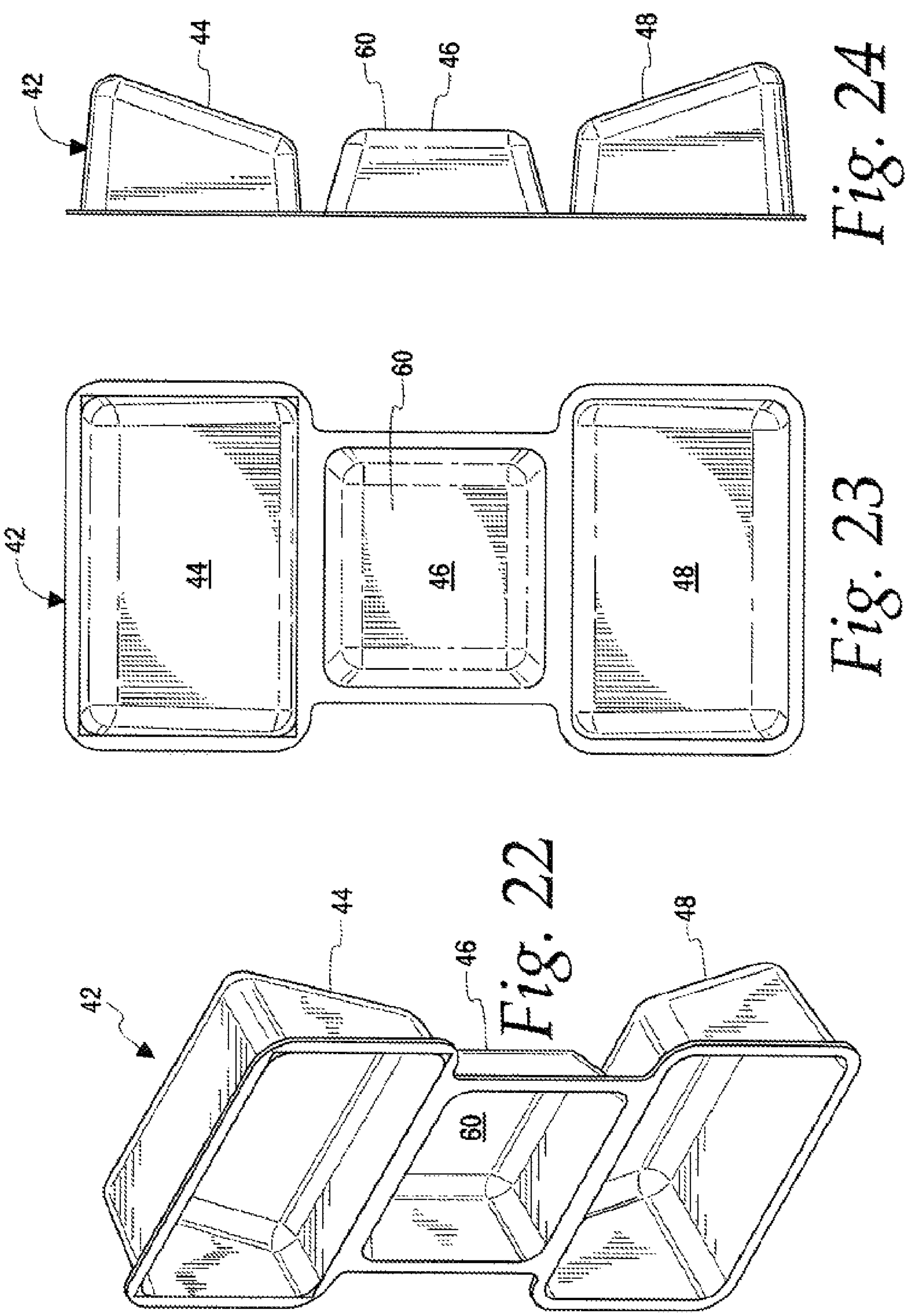
FIG. 22 is a perspective view of an eleventh embodiment.
FIG. 23 is a front elevation view thereof.
FIG. 24 is a right side elevation view thereof.

FIGS. 22-24 illustrate a further embodiment comprising a tray 42 for use in a packaged food product like that of FIG. 1. The tray 42 of FIGS. 22-24 includes an upper compartment 44, an intermediate compartment 46 and a lower compartment 48. The tray 42 is generally dumbbell-shaped and is otherwise similar to the tray of FIG. 1, except that (1) the tray is symmetrical about a horizontal axis, with its intermediate compartment 46 having a generally vertical back wall 60 and (2) the tray is wider than the tray of FIG. 1. Food packages employing the tray of FIGS. 22-24 may include a back panel, but will not necessarily include a back panel.

Figure 25:
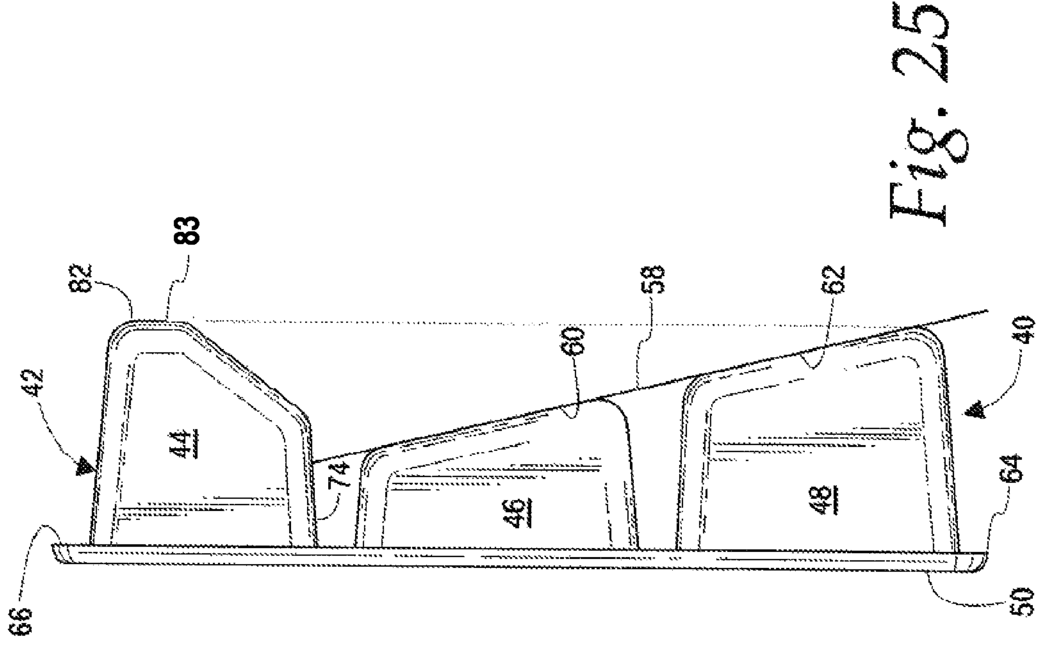
FIG. 25 is a right side elevation view of a twelfth embodiment.

FIG. 25 illustrates a further embodiment similar to that of FIGS. 1-7, except that in the embodiment illustrated in FIG. 25, the back wall 82 of the upper compartment 44 has a generally planar surface 83 disposed in a plane that is tangent to the deepest portion of the bottom compartment 48. In this embodiment, the maximum depth of the upper compartment is equal to the maximum depth of the bottom compartment 48. That is, the distance from a plane defined by a front surface of the flange 66 to the rearmost portion of the bottom compartment 48 is equal to the distance from the same plane to the rearmost portion of the top compartment. This configuration may provide increased stability of the rigid thermoformed tray 42 during filling due to increased surface area being in contact with a conveyor. That is, if the tray is filled prior to attachment of the back card 58, with the tray being in a generally horizontal position on a conveyor or other supporting surface, the generally planar surface 83 provides increased contact area, to increase stability such that the tray is less susceptible to tipping, sliding, rocking or other undesirable movement relative to the conveyor or other supporting surface.

What is claimed is:

1. An array of packaged food products comprising:

a plurality of generally dumbbell-shaped packages, each of the packages displayed in an upright orientation on edge and simultaneously arranged to stand in a horizontal back-to-front stack or array such that a back of one of the packages of the plurality of generally dumbbell-shaped packages engages and is adjacent to a front of another package of the plurality of generally dumbbell-shaped packages, with 5 to 20 grams of protein from three different food items in each of the packages;

each of the packages having a front comprising a transparent front portion, an upper cavity, a first food item of the three different food items in the upper cavity, a middle cavity, a second food item of the three different food items in the middle cavity, a bottom cavity, a third food item of the three different food items in the bottom cavity, and a back card, the back card having a first end and a second end; each of the upper cavity, the middle cavity and the bottom cavity having a rear wall and a maximum depth; the middle cavity having a maximum depth less than that of the upper and bottom cavities;

the upper cavity, the middle cavity and the bottom cavity of each of the packages being arranged in a vertical row, each of the three different food items being visible through the transparent front portion of the package;

each of the packages, being generally dumbbell-shaped as viewed from the front and from other angles to contribute to an appearance and theme, comprising a center portion and end portions adjacent the center portion, the center portion being narrower than the end portions adjacent to the center portion, with each of the packages having a reduced central width providing a recessed midsection that helps to provide the appearance and theme, and facilitates holding of the package by potential purchasers, with each of the packages having a height of 6 to 7 in., a maximum width of 3 to 4 in., and a maximum depth of about 1 to 4 in.; and protein content information using text and graphics displayed on the front of each of the packages, with other text, graphics and colors on the package to provide brand information, ingredient information, and nutritional information;

each of the packages of the generally dumbbell-shaped packages being self-supporting in the upright orientation on edge, each of the packages including a flange, with the flange and the back card stably supporting each of the packages, and with the second end of the back card being spaced from the flange;

wherein the rear walls of the bottom and middle cavities are coplanar, and wherein the rear wall of the upper cavity is not coplanar with the rear walls of the bottom and middle cavities, and wherein the back card is planar, and wherein the back card is flush with and engages the coplanar rear walls of the bottom and middle cavities and does not engage the upper cavity, and wherein the back card extends downward from and beyond the rear wall of the bottom cavity parallel to the plane of the rear wall of the bottom cavity, and extends rearward beyond the rear wall of the bottom cavity.

2. The array of packaged food products of claim 1 wherein each of the packages has 12 to 14 grams of protein from the three different food items therein.

3. The array of packaged food products of claim 1 wherein each of the packages has about 13 grams of protein from the three different food items therein.

4. The array of packaged food products of claim 1 wherein at least two of the three different food items are proteinaceous food items.

5. The array of packaged food products of claim 1 wherein each of the upper cavity, the middle cavity and the bottom cavity is hermetically sealed and gas flushed.

6. The array of packaged food products of claim 1 wherein at least two of the three different food items are proteinaceous food items, and wherein each of the packages has a maximum depth of about 2 inches to 3 inches.

7. The array of packaged food products of claim 1 wherein the back card of each of the packages extends downward and rearward at an angle of 5 to 40 degrees relative to the flange of each of the packages.

8. The array of packaged food products of claim 1 wherein the back card of each of the packages extends downward and rearward at an angle of 15 to 30 degrees relative to the flange of each of the packages.

9. The array of packaged food products of claim 1 wherein the back card of each of the packages extends downward and rearward from the bottom cavity at an angle of 5 to 40 degrees relative to the flange of each of the packages.

10. The array of packaged food products of claim 1 wherein the back card of each of the packages extends downward and rearward from the bottom cavity at an angle of 15 to 30 degrees relative to the flange of each of the packages.

11. The array of packaged food products of claim 1 wherein each of the packages has a flange width of 5 to 6 mm and a flange return dimension of 0 to 5 mm.

12. The array of packaged food products of claim 1 wherein each of the packages has a flange width of 5 to 6 mm and a flange return dimension of 2 to 3 mm.

13. The array of packaged food products of claim 1 wherein the protein content information includes the expression "protein pack".

14. The array of packaged food products of claim 1 wherein the upper cavity includes a top wall of the upper cavity that extends rearward from the flange and slopes downward from the flange, and a bottom wall of the upper cavity that extends rearward from the flange and slopes upward from the flange, and wherein the rear wall of the upper cavity slopes downward and forward from the top wall of the upper cavity to the bottom wall of the upper cavity.

15. A packaged food product comprising:

a generally dumbbell-shaped package displayed in an upright orientation on edge, and 5 to 20 grams of protein from three different food items in the package;

the package having a front comprising a transparent front portion, an upper cavity, a first food item of the three different food items in the upper cavity, a middle cavity, a second food item of the three different food items in the middle cavity, a bottom cavity, a third food item of the three different food items in the bottom cavity, and a back card, the back card having a first end and a second end; each of the upper cavity, the middle cavity and the bottom cavity having a rear wall and a maximum depth; the middle cavity having a maximum depth less than that of the upper and bottom cavities;

the upper cavity, the middle cavity and the bottom cavity being arranged in a vertical row, each of the three different food items being visible through the transparent front portion of the package;

the package, being generally dumbbell-shaped as viewed from the front and from other angles to contribute to an appearance and theme, comprising a center portion and end portions adjacent the center portion, the center portion being narrower than the end portions adjacent to the center portion, the package having a reduced central width providing a recessed midsection that helps to provide the appearance and theme, and facilitates holding of the package by potential purchasers, the package having a height of 6 to 7 in., a maximum width of 3 to 4 in., and a maximum depth of about 1 to 4 in.; and protein content information using text and graphics displayed on the front of the package, with other text, graphics and colors on the package to provide brand information, ingredient information, and nutritional information;

the package being self-supporting in the upright orientation on edge, the package including a flange, with the flange and the back card stably supporting the package, and with the second end of the back card being spaced from the flange;

wherein the rear walls of the bottom and middle cavities are coplanar, and wherein the rear wall of the upper cavity is not coplanar with the rear walls of the bottom and middle cavities, and wherein the back card is planar, and wherein the back card is flush with and engages the coplanar rear walls of the bottom and middle cavities and does not engage the upper cavity, and wherein the back card extends downward from and beyond the rear wall of the bottom cavity parallel to the plane of the rear wall of the bottom cavity, and extends rearward beyond the rear wall of the bottom cavity.

* * * * *